March 17, 1959     R. L. BEIL ET AL     2,877,644
SLOSH AND VIBRATION TABLE

Filed Feb. 18, 1957     2 Sheets-Sheet 1

INVENTORS.
Richard L. Beil
Harry A. Holmes
Alfred J. Daniels

BY *Duane C. Bowen*
ATTORNEY.

March 17, 1959 R. L. BEIL ET AL 2,877,644
SLOSH AND VIBRATION TABLE
Filed Feb. 18, 1957 2 Sheets-Sheet 2

INVENTORS.
Richard L. Beil
Harry A. Holmes
Alfred J. Daniels
BY Duane C. Bowen
ATTORNEY.

United States Patent Office 2,877,644
Patented Mar. 17, 1959

2,877,644

SLOSH AND VIBRATION TABLE

Richard L. Beil, Harry A. Holmes, and Alfred J. Daniels, Wichita, Kans., assignors to Boeing Airplane Company, Wichita, Kans., a corporation of Delaware Application February 18, 1957, Serial No. 640,914

10 Claims. (Cl. 73—71.6)

Our invention relates to devices designed to produce vibration for testing or other purposes and, more particularly, to a slosh and vibration table for testing fuel cells and the like.

Various devices have been conceived to produce vibration, particularly for testing purposes. The testing of fuel cells to simulate an airplane environment involves greater weight and magnitude of forces than is found in most other equipment of this type. A fuel cell to be tested may weigh as much as 25,000 pounds and contain as much as 4000 gallons. The test equipment should produce conditions generally found in operation of aircraft. One condition is a tilting movement in which the liquid and fuel cell will slosh from end to end of the cell. A second condition is one of high frequency vibration which may be about 2000 cycles per minute in the test equipment. A problem is created in test equipment by the large and shifting weights involved and the frequency of vibration. It is an object of our invention to provide a slosh and vibration assembly particularly adapted for these extreme conditions.

Any vibrated assembly, taken from zero to a high frequency, has one or more points where the vibrations are resonant in the assembly and magnify in destructive force. Massive structure would be required to withstand these resonant vibrations with the weights involved in testing fuel cells. It is a further object of our invention to devise vibration producing means which will avoid or minimize the force of resonant vibrations. More particularly it is an objective to use rotary vibrators and to apply an unbalanced load after the rotating bodies have reached the desired speed of rotation. Conversely, it is an objective to remove the unbalanced load before the rotating members are slowed. Removal of the weight means complete transfer from the vicinity of the rotor.

Further objectives include: to provide the above features in an economical and durable structure requiring a minimum of maintenance and to provide fail-safe features including the discharge of the unbalanced load upon failure of power to operating or control mechanisms.

Our invention will be best understood, together with additional advantages and objectives thereof, from the following description, read with reference to the drawings, in which.

Figure 1:
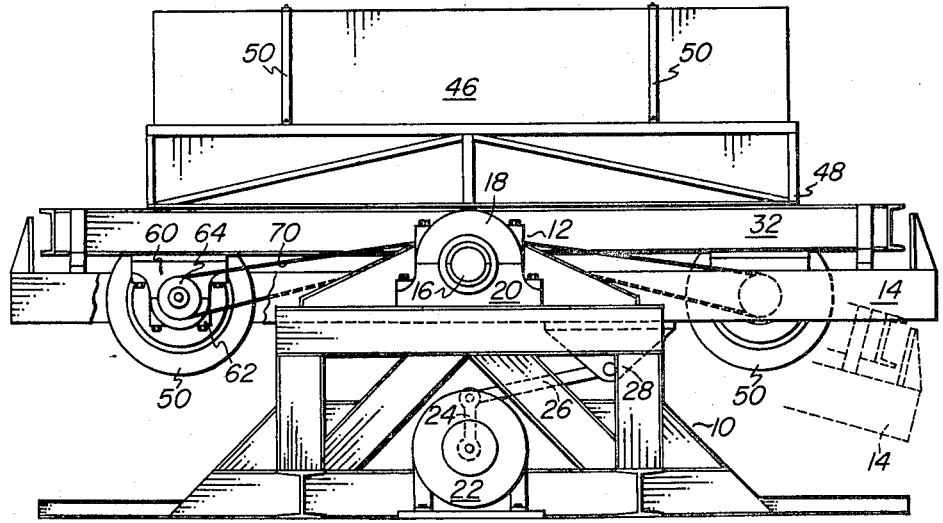
Figure 1 is a side elevation of a specific embodiment of our invention with certain parts broken away or shown in dotted lines to better illustrate the structure.
Figure 2:
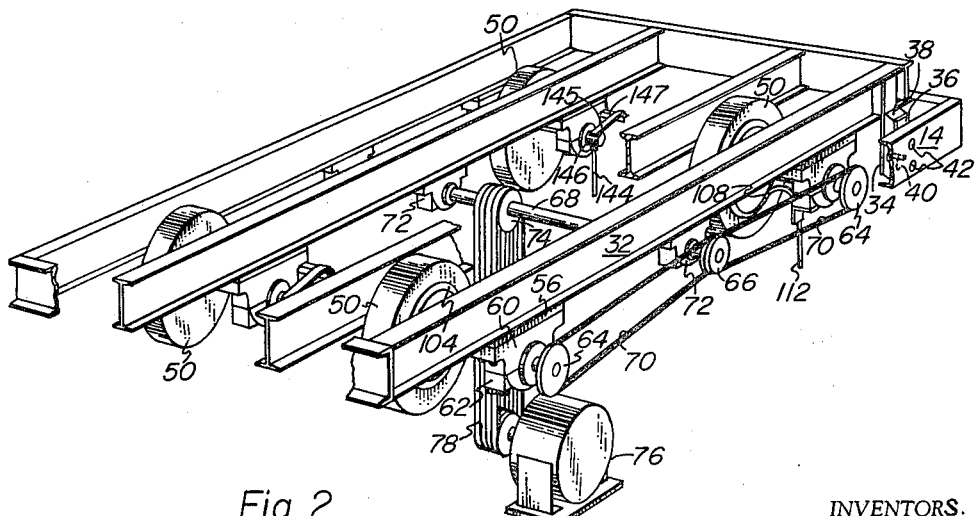
Figure 2 is a perspective view of portions of the slosh and vibration table with portions broken away to reveal concealed parts.

A slosh and vibration table is shown having a base 10 secured to a floor or the like and having structural members such as I-beams, channels and angles built up to support a pair of bearing members 12. A pivotal table 14 has medial trunnions 16 supported by the upper and lower portions 18. 20 of each bearing 12. A motor 22 operates pivot table 14 by means of a crank arm 24 and a link 26 pivotally secured to a depending bracket 28 on table 14. The pivoting of table 14 is indicated in dotted lines and a total pivot angle of 30° is shown divided into 15° on each side of horizontal. The rocking or tilting action developed simulates similar action of the aircraft. The rate of rocking may be between 10 and 16 cycles per minute and normally will remain constant throughout a given test.

A vibration platform 32 is superposed to table 14 Vibration isolators therebetween are provided at each corner by a first plate 34 depending from platform 32, a second aligned plate 36 secured to table 14 and a resilient pad 38 between the plates. Pad 38 may be formed of a high grade of rubber and will have a first set of bolts 40 securing the pad to plate 34 and a second (mismatched) set of bolts 42 securing the pad to plate 36. The free ends of bolts 40, 42 are countersunk in the pads and do not pass into the opposed plate 36, 34 whereby the resilient pad may absorb considerable vibrations and not transmit them to table 14.

One proposed size of platform 32 is 12 x 18 feet but the size selected for any installation will depend on the dimensions of the fuel cells to be tested. In the example, it was estimated that the vibrating platform including the vibrating mechanism would weigh approximately 15,000 pounds. The net load to be placed on the platform would vary between 5000 and 25,000 pounds. Fuel cells to be tested vary in sizes and shapes and no specific loading pattern for the vibrating platform can be established. A fuel cell 46 is shown supported on platform 32 with supports taking the form of a frame 48 and straps 50. Every effort is made to locate the load symmetrically on the vibrating platform and to have the load as widely distributed over the platform top as practicable. The approximate center of gravity of the load is preferably about 24 inches above the top of platform 32. The load is usually fuel and the cells are filled approximately two-thirds so a shift in the center of gravity of the load will occur as the fuel sloshes.

To provide symmetrical forces of vibration, as may be desirable with the given weights, four rotors 50 are shown disposed in the four corners of platform 32. The rotors are journaled on axles 52 which are supported at their ends by anti-friction bearings 54. The bearings are supported by depending supports which may take the form of a plate 56 welded to the bottom of I-beam 58, an upper bearing support member 60 secured to plate 56, and a lower bearing support member 62 bolted to upper support member 60. Sheaves 64, secured to the ends of axles 52, are connected to sheaves 66 on a central drive shaft 68 by belts 70. Central drive shaft 68 has bearing supports 72 and has a central sheave 74. A motor 76 drives sheave 74 by a plurality of belts 78. With this type of connection to the power unit, all of the rotors rotate in the same direction. This means that unbalanced loads, if clocked in the same position in each rotor, will produce vibration in two planes, e. g., along both a horizontal and vertical axis. The selected amplitude of vibration need only be obtained in one axis and amplitude in the other axis should be equal to or less than the selected amplitude. Vibration in both axes is thought preferable but vibration in only the vertical plane can be accomplished by counter-rotating rotors 50 on opposite sides of journals 16.

In the present design a frequency of vibration desired in order to carry out a proposed test program was 2000 cycles per minute. In operation the frequency of 2000 cycles per minute will be established in the rotating rotors and then the unbalanced weight will be introduced into present rotors. The amount of weight introduced into the rotors will determine the amplitude of vibration. In the present design as a specific example, the double amplitude selected for test purposes was 0.032 inch and the maximum allowable double amplitude was selected as 0.042 inch. The expression "double amplitude" means the distance from a rest position the platform 32 moves in one direction during vibration, i. e., if vibration frequency and amplitude are charted as a sine curve, the double amplitude would be the distance plus or minus from the zero amplitude base line. By the means hereafter described the amount of weight necessary to reach the desired amplitude is added to the rotors after the desired revolutions per minute is reached. Amplitude can be measured during the tests so that the addition of weight will be stopped when the desired amplitude is reached. At the completion of the test, the unbalanced weight will be removed from the rotors and then the frequency reduced to zero. This system of operation prevents the vibrating platform from going through undesirable resonances during the time that the frequency of rotation is being brought up to speed or reduced to zero. One safety feature is the addition of the unbalanced load after desired speed of rotation has been reached and the removal of the unbalanced load before slowing rotation. This is a complete removal and not merely a disengagement or shifting of the load. There is less danger of malfunction when the load is completely removed.

Figure 3:
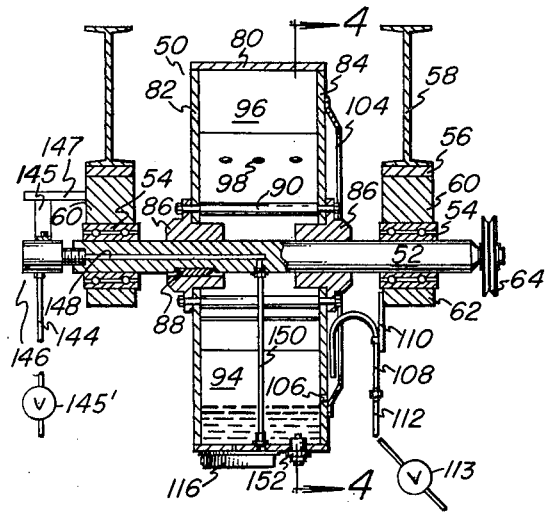
Figure 3 is an enlarged elevational view of a vibration rotor and supports with portions shown in section on a plane adjacent to the axis of rotation.
Figure 4:
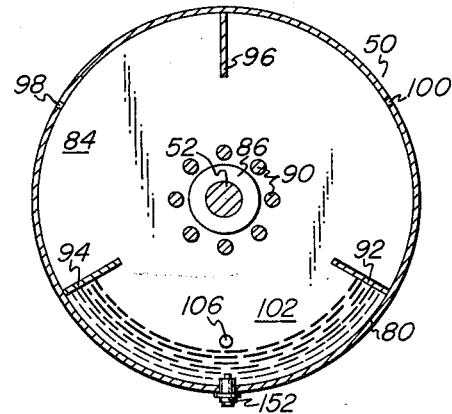
Figure 4 is a sectional view taken on line 4—4 of Figure 3.

To now described the construction of the rotors and the means for adding the unbalanced weight, Figures 3 and 4 show the interior construction of the rotors. Rotor 50 is fabricated into a hollow cylinder with a peripheral wall 80 and side walls 82, 84. Rotor 50 is mounted on axle 52 by a pair of end pieces 86 secured to axle 52 against rotation by key means 88. End pieces 86 are secured together by bolts 90. The means selected to form a chamber in rotor 50 is a pair of radially disposed walls 92, 94 spaced 120° apart and bridging peripheral wall 80 and the adjacent portions of side walls 82, 84. A third short wall 96 is provided so that the rotors will be symmetrical. The spaces between walls 94 and 96 and between walls 92 and 96 are not intended to hold liquid and discharge openings 98, 100 are provided therein to discharge any water happening to reach these spaces.

Water is introduced to the chamber 102 formed between walls 92, 94 by a slinger ring 104 secured to the face of wall 84. An opening 106 is provided from slinger ring 104 to chamber 102. Slinger ring 104 is an annulus with inner walls sloping in a direction whereby water deposited inside the ring in the channel formed thereby will be directed by centrifugal force through opening 106 into chamber 102. Water added while rotor 50 is rotating will assume the unbalanced position illustrated in Figure 4 with the liquid center of mass spaced from the axis of rotation of rotor 50. This will produce vibrations. A water line 108 is disposed to discharge in slinger ring and is supported by bracket 110 secured to bearing support member 62. A flexible hose 112 may be connected to a source of water which is manually controlled as by valve 113. Amplitude of vibration is controlled by the amount of water added. The amplitude of vibration may be measured during operation to adjust the amount of water to produce the desired amplitude. As indicated above, the liquid will be added after the desired speed of rotation is reached preventing resonant vibration. Other liquids may be substituted but water is suitable and most inexpensive.

Figure 5:
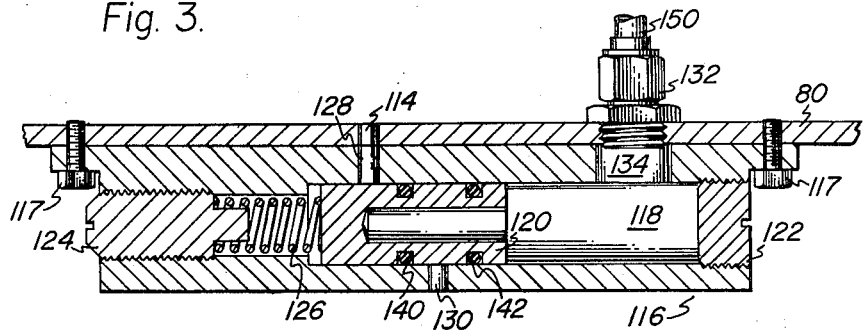
Figure 5 is an enlarged fragmentary view, principally in section, of one valve on the rotor.

Two discharge openings are provided in peripheral wall 80. The first primary discharge opening 114 communicates with a control valve 116 having a chamber 118 in which a valve piece 120 is slidably mounted. Control valve 116 is secured to wall 80 by screws 117. Chamber 118 has end closure plugs 122, 124 and the latter supports a compression spring 126. Spring 126 normally presses valve piece 120 to the right hand side in Figure 5 and passage of water out of rotor 50 is permitted through the communicating ports 128, 130.

A fitting 132 is provided in an opening in peripheral wall 80 which communicates with a port 134 at the right hand side of valve 116. When pneumatic pressure is applied through fitting 132 to the right hand side of valve piece 120, the valve piece is moved to the left side in which position O-rings 140, 142 seal chamber 118 and valve piece 120 against passage of liquid between ports 128 and 130. The valve has a fail-safe feature in that compression spring 126 will push the valve to open position upon failure of pneumatic pressure. A source of pneumatic pressure may be manually controlled as by valve 145' and is connected to fitting 132 by a flexible line 144 connected to a swivel connector 146 at one end of axle 52. Connector 146 communicates with a central axle passageway 148 which connects medially of rotor 50 to a line 150 extending to fitting 132. Swivel connector 146 is supported and secured against rotation by an arm 145 secured to a bracket 147 on bearing member 60. As before indicated, control valve 116 will be closed after the desired speed of rotation has been achieved and the water will then be added. Before rotation is slowed, the application of pneumatic pressure will be terminated so that the valve will permit discharge of water.

Figure 6:
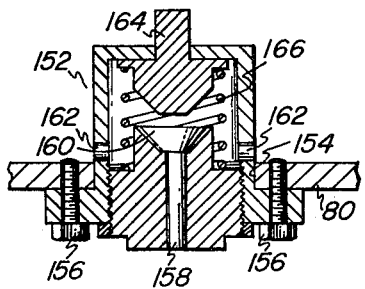
Figure 6 is a similar view of the second valve on the rotor.

As a safety feature, a second valve 152 is secured in an opening 154 in wall 80 by screws 156. Safety valve 152 has a central discharge passageway 158 with a valve seat 160 at its upper end and passageway 158 communicates with side ports 162. A weighted valve piece 164 is normally pressed by compression spring 166 to the open position shown in Figure 6. Under centrifugal force, the weighted valve piece 164 will close against valve seat 160 sealing discharge passageway 158 when the desired speed of rotation is achieved. The weight of valve piece 164 and the strength of spring 166 are designed so that the closing movement will occur at a speed of rotation somewhat below the operating speed. This valve is a safety feature in that it assumes an open position when speed of rotation is below the selected value even if valve 116 should not open due to negligence or malfunctioning.

Having thus specifically described our invention, we do not wish to be understood as limiting ourselves to the precise structure disclosed but instead wish to cover those modifications thereof which will occur to those skilled in the art after examining our disclosure and which properly fall within the scope of our invention, as described in the appended claims.

We claim:

1. The improvement in a slosh and vibration table for testing fuel cells having a base, a table pivotally mounted on the base, a vibration platform adapted to support a fuel cell and superposed to said table and mounted thereon by means including vibration isolators, vibration producing means mounted on said platform, and power means connected to said table to move the same in pivotal oscillations, comprising: said vibration producing means being four rotors positioned adjacent the corners of said platform and rotatably mounted thereon with the axes of rotation horizontally disposed and power means operative to rotate said rotors, each rotor having means defining a chamber therein disposed to confine water in the chamber when rotated in a position with the center of the water mass spaced from the rotor axis of rotation, each rotor having an annular ring disposed on a face thereof defining an annular water receiving channel between portions of the ring and the rotor and the rotor having an ingress opening from the channel to said chamber for supply of water, means including a water source having a line disposed to discharge into each channel, each rotor having a pair of discharge openings in the periphery thereof communicating with the chamber therein for discharge of water, a safety valve on each rotor controlling flow through one of said discharge openings, said safety valve having a weighted valve member disposed to close the valve by centrifugal force and having a spring operating on the valve member to keep the valve open until the centrifugal force reaches a selected magnitude, a control valve on each rotor controlling flow through the other discharge opening, a valve member in the control valve movable between an open and a shut position and a spring normally urging the valve member to an open position, means including a source of pneumatic pressure connected to the control valve and operable to move said control valve member to the shut position, whereby water may be added to the rotors to produce vibration after the rotors have reached a selected speed of rotation and whereby the water may be discharged before the rotors are slowed to avoid destructive resonant vibrations.

2. The improvement in a slosh and vibration table for testing fuel cells having a base, a table pivotally mounted on the base, a vibration platform adapted to support a fuel cell and superposed to said table and mounted thereon by means including vibration isolators, vibration producing means mounted on said platform, and power means connected to said table to move the same in pivotal oscillations, comprising: said vibration producing means comprising at least one rotor rotatably mounted on said platform to rotate in an upright plane and power means operative to rotate said rotor, said rotor having means defining a chamber therein disposed to confine water in the chamber when rotated in a position with the center of the water mass spaced from the rotor axis of rotation, said rotor having an annular ring disposed on a face thereof defining an annular water receiving channel between portions of the ring and the rotor and the rotor having an ingress opening from the channel to said chamber for supply of water, means including a water source having a line disposed to discharge into said channel, said rotor having a discharge opening in the periphery thereof communicating with the chamber therein for discharge of water, a control valve on said rotor controlling flow through said discharge opening, a valve member in the control valve movable between an open and a shut position and a spring normally urging the control valve member to an open position, means including a source of pneumatic pressure connected to the control valve and operable to move said control valve member to the shut position, whereby water may be added to the rotor to produce vibration after the rotor has reached a selected speed of rotation and whereby the water may be discharged before the rotor is slowed to avoid destructive resonant vibrations.

3. The subject matter of claim 2 in which said rotor has a second discharge opening in the periphery thereof, a safety valve on said rotor controlling flow through said second discharge opening, said safety valve having a weighted valve member disposed to close the valve by centrifugal force and having a spring operating thereon to keep the safety valve open until centrifugal force reaches a selected magnitude.

4. The subject matter of claim 2 in which said chamber is formed by a pair of generally radially disposed baffle walls disposed at opposite sides of the discharge opening and bridging the side and peripheral inner rotor walls to prevent water passing thereby, whereby water will be held confined in the chamber when pressed to an outward position by centrifugal force.

5. The subject matter of claim 2 in which said source of pneumatic pressure is connected to said control valve by means including a radial line from said control valve, said rotor having an axle with a passageway to one end and having a medial connection with said radial line, a swivel connector at said end of said rotor communicating with said passageway and a line from said swivel connector to said pneumatic pressure source.

6. The improvement in a vibration table for testing fuel cells or the like, comprising: a rotor rotatably mounted on said platform to rotate in an upright plane and power means operative to rotate the rotor, said rotor having means defining a chamber therein disposed to confine liquid in the chamber when rotated in a position with the center of the liquid mass spaced from the rotor axis of rotation, said rotor having a ring disposed on a face thereof defining an annular liquid receiving channel between portions of the ring and the rotor and the rotor having an ingress opening from the channel to said chamber for supply of liquid, means including a liquid source external of said rotor and having a line disposed to discharge into said channel, said rotor having a discharge opening in the periphery thereof communicating with the chamber therein for discharge of liquid, a control valve on said rotor controlling flow through said discharge opening, a valve member in said control valve movable between an open and shut position and means connected to said control valve and operable externally of the rotor to move said valve member between said positions during operation of said rotor, whereby liquid may be added to the rotor to produce vibration after the rotor has reached a selected speed of rotation and whereby the liquid may be discharged before the rotor is slowed to avoid destructive resonant vibration.

7. Vibration producing apparatus, comprising: a support member adapted to support a member to be vibrated, a rotor secured to said support member and rotatably mounted relative the same, power means operable to rotate said rotor, said rotor having means forming a chamber therein operable to confine liquid therein when rotated in a position with the center of liquid mass displaced from the rotor axis of rotation to produce vibration, liquid supply means external of the rotor and transfer filling means between said liquid supply means and said rotor operable during rotation to supply liquid to said chamber, said rotor having a discharge passageway from said chamber for discharge of liquid from said chamber during rotation of said rotor, and means connected to said rotor operable externally of said rotor during rotation and operative to control discharge of liquid through said passageway.

8. The subject matter of claim 7 in which the last mentioned means includes valve means for said discharge passageway including a valve member movable between a position opening said passageway and a position closing said passageway, spring means normally urging the valve member to the open position, a source of pneumatic pressure external of said rotor and support member, and a line from the source to said valve means and directed to force said valve member to the closed position when pressure is applied, said discharge passaegway being disposed so that liquid is discharged from said chamber under centrifugal force when said valve member is in said open position.

9. The subject matter of claim 7 in which said transfer filling means includes a ring on said rotor defining an annular liquid receiving channel between portions of the ring and rotor and said rotor having an opening between said channel and said chamber, and a line from said liquid supply means disposed to discharge into said channels, said discharge passageway being disposed so that liquid may be discharged from said chamber under centrifugal force.

10. The subject matter of claim 7 in which said rotor has a second discharge passageway from said chamber disposed to exhaust liquid therefrom under centrifugal force during rotation, a safety valve on said rotor having a weighted valve member movable between positions opening and closing said second passageway, spring means normally holding said valve member in its open position and of a strength overcome by the weight of the valve member moving the same to closed position when the centrifugal force has reached a sufficient magnitude due to the speed of rotation of said rotor.

References Cited in the file of this patent

UNITED STATES PATENTS

| | | |
|---|---|---|
| 2,610,523 | Kahn | Sept. 16, 1952 |
| 2,703,490 | Brueggeman et al. | Mar. 8, 1955 |